(12) United States Patent
Farshidi et al.

(10) Patent No.: US 10,963,618 B1
(45) Date of Patent: Mar. 30, 2021

(54) MULTI-DIMENSION CLOCK GATE DESIGN IN CLOCK TREE SYNTHESIS

(71) Applicant: Cadence Design Systems, Inc., San Jose, CA (US)

(72) Inventors: Amin Farshidi, Austin, TX (US); William Robert Reece, Over (GB); Kwangsoo Han, Austin, TX (US); Thomas Andrew Newton, Great Cambourne (GB); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 16/735,665

(22) Filed: Jan. 6, 2020

(51) Int. Cl.
| | | |
|---|---|---|
| *G06F 30/396* | (2020.01) | |
| *G06F 30/398* | (2020.01) | |
| *G06F 119/12* | (2020.01) | |
| *G06F 117/12* | (2020.01) | |
| *G06F 119/06* | (2020.01) | |
| *G06F 117/04* | (2020.01) | |

(52) U.S. Cl.
CPC .......... *G06F 30/396* (2020.01); *G06F 30/398* (2020.01); *G06F 2117/04* (2020.01); *G06F 2117/12* (2020.01); *G06F 2119/06* (2020.01); *G06F 2119/12* (2020.01)

(58) Field of Classification Search
CPC .. G06F 30/396; G06F 30/398; G06F 2119/12; G06F 2119/06; G06F 2117/12; G06F 2117/04
See application file for complete search history.

(56) References Cited

U.S. PATENT DOCUMENTS

| | | | | |
|---|---|---|---|---|
| 5,724,250 | A  * | 3/1998 | Kerzman | G06F 30/327 |
| | | | | 716/113 |
| 6,536,024 | B1 * | 3/2003 | Hathaway | G06F 1/10 |
| | | | | 327/295 |
| 8,302,057 | B2 * | 10/2012 | Saika | H01L 27/11807 |
| | | | | 716/119 |
| 10,198,551 | B1 * | 2/2019 | Farshidi | G06F 30/3312 |
| 2006/0107239 | A1 * | 5/2006 | Zhang | G06F 30/327 |
| | | | | 716/102 |
| 2007/0033560 | A1 * | 2/2007 | Johnston | G06F 30/327 |
| | | | | 716/114 |
| 2015/0310153 | A1 * | 10/2015 | Taskin | G06F 30/367 |
| | | | | 716/114 |
| 2017/0351797 | A1 * | 12/2017 | Taskin | G06F 30/367 |
| 2019/0213296 | A1 * | 7/2019 | Lin | H03K 19/00 |

* cited by examiner

*Primary Examiner* — Stacy Whitmore
(74) *Attorney, Agent, or Firm* — Schwegman Lundberg & Woessner, P.A.

(57) ABSTRACT

Electronic design automation systems, methods, and media are presented for multi-dimension clock gate design in clock tree synthesis. In one embodiment, an input list of clock gate types is accessed, and the list is then used in generating a clock gate matrix. A circuit design with a clock tree is then accessed. The multi-dimensional design involves automatically selecting, for a first clock gate of the routing tree, a first clock gate type from the clock gate matrix based on a size and associated area for the first clock gate type to select a drive strength value for the first clock gate in the routing tree. The first clock gate is then resized to generate a resized first clock gate using the clock gate matrix to adjust a first delay value associated with the first clock gate while maintaining the drive strength value.

20 Claims, 10 Drawing Sheets

MULTI-DIMENSION CLOCK GATE DESIGN IN CLOCK TREE SYNTHESIS

TECHNICAL FIELD

Embodiments described herein relate to electronic design automation (EDA), and to systems, methods, devices, and instructions to perform clock gating with design selection of delay and power dimensions as part of design, verification, and generation of circuit designs.

BACKGROUND

Electronic design automation (EDA) is a category of systems for assisting with the design of electronic systems and devices. Large, integrated circuit designs are often assembled from previously designed blocks or generic designs which may include various combinations of elements. This enables reduced turnaround times for generation of an integrated circuit. Cells are blocks within a design that can be replicated. Clock tree synthesis (CTS) is a process of designing routing structures to deliver a clock signal to elements of a synchronous circuit. Schematic and layout information for such block portions of a design may be exchanged or licensed as intellectual property. During design of a specific circuit, large numbers of combinations of different variables that go into a design may require significant resources to verify that all acceptable combinations will function properly.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
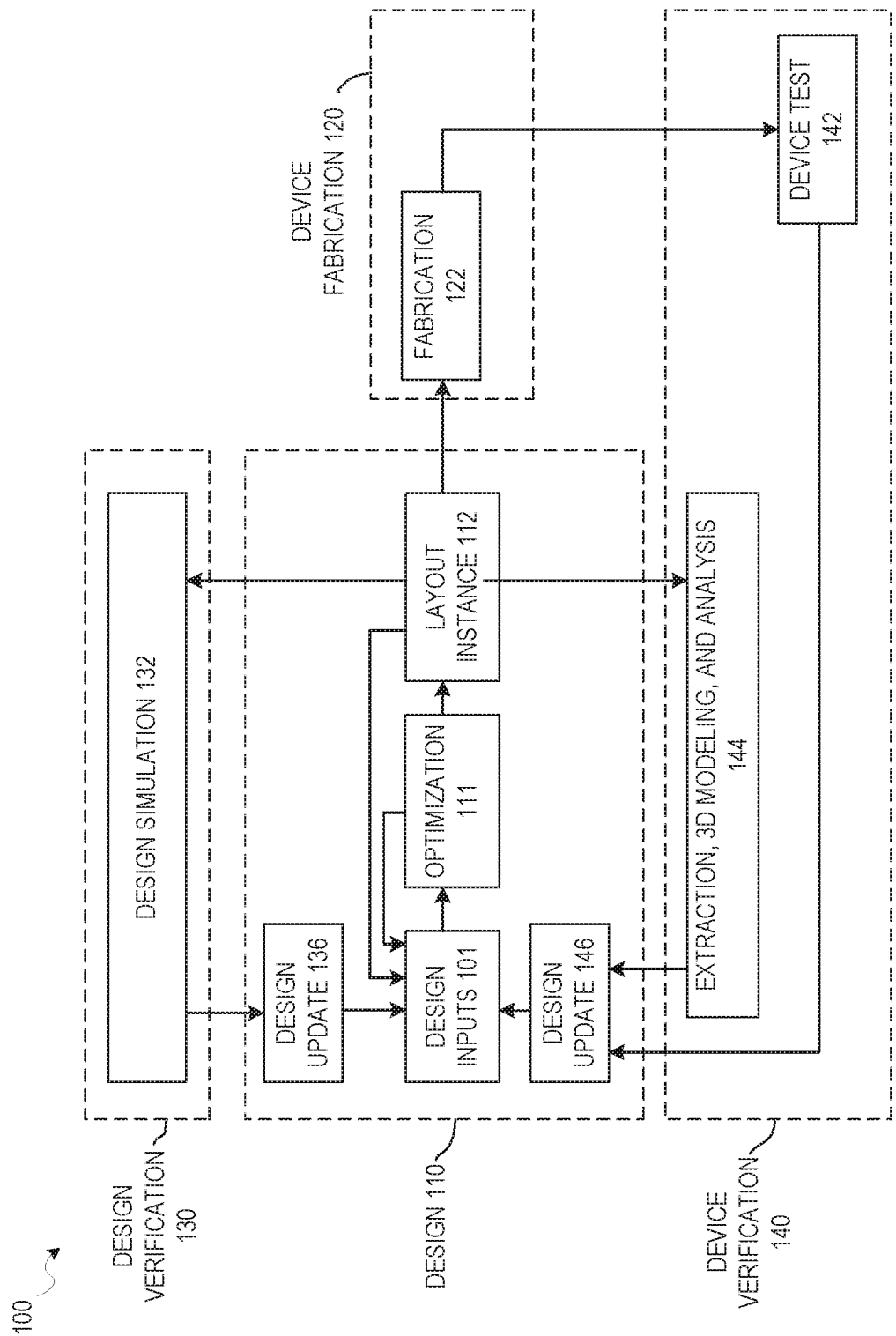
FIG. 1 is a diagram illustrating one possible design process flow for generating a circuit including embodiments to meet timing constraints according to some embodiments.

Embodiments described herein relate to EDA and to methods, computer media, and devices used for analyzing, optimizing, and creating electronic circuits. One of the many complex elements of circuit design is the generation of routing trees that convey a signal from a signal origin, or source, to a signal destination, or sink. A clock tree, for example, has a clock source and can be attached to hundreds or thousands of destination sinks. Clock gating is a technique used in many synchronous circuits for reducing dynamic power dissipation by adding logic to a circuit to prune the clock tree. This disables portions of the clock circuitry so that the flip-flop elements in them do not have to switch states, thus reducing power usage. Clock gates (e.g. integrated clock gate circuitry or cells) that perform this gating, however, are limited in the number of flip-flop elements that can be driven by a single cell, and also impact the delay in a routing tree between a source and sinks in the fanout for a clock gate.

The limit on the number of elements that can be driven by a single clock gate is a primary dimension for selecting clock gates in current clock tree synthesis EDA systems. Such systems initially build a clock tree with a clock gate type having the maximum available drive strength and area usage. A library of clock gate designs is then used with resizing algorithms to decrease the area in the circuit design used by clock gates while still maintaining the ability to drive the load of the sinks in the clock tree. While different clock gate designs can have different characteristics that change other than power and area, such as insertion delay, existing systems organize and optimize clock gate select based on area and power (which are correlated, in that larger area designs provide larger power). The focus on area and power makes it difficult to manage design rule violations in multiple categories, such as slew and insertion delay, that are impacted by the selection of a particular clock gate design, as such additional design constraints change when a clock gate is resized to different sizes and associated drive strengths.

Embodiments described herein generate a clock gate matrix with multiple dimensions, including both a drive strength (or area) dimension for an initial design step, and a second dimension associated with delay that can be used in a second resizing step to further construct a routing tree to meet design criteria. For example, design rule violations (DRV) based on circuit design can include timing constraints. While buffers can be used in some situations to meet timing constraints, in some systems, buffering is disabled or limits performance. By modifying clock gate selection to address DRVs, embodiments described herein can generate circuits with improved performance. Such embodiments improve a circuit design by meeting DRV constraints (e.g. delay and skew rules) without additional elements (e.g. buffers or sizing offsets) which use design resources (e.g. additional space or power resources). Embodiments thus improve circuit designs by meeting improving timing performance in systems which use fewer buffer elements to manage delay in a routing tree. Embodiments can also enable fine balancing with clock gate selection, which can improve total power performance and total negative slack at earlier design states. Additionally, some embodiments can improve the performance of a design by improving skew while limiting buffer circuit use, as buffer circuits increases the delay of faster branches within a tree to limit skew Embodiments herein can balance branches of a routing tree without such increases by adjusting delays associated with a clock gate. This can particularly provide improvements when buffering use is disabled or limited (e.g. due to multi-supply voltage constraints or high performance designs where clock latency is to be minimized).

FIG. 1 is a diagram illustrating one possible design process flow which includes elements for multi-dimension (e.g. area and delay) clock gate design in clock tree synthesis as part of a circuit design process flow. It will be apparent that other design flow operations can function using such multi-dimension clock gate design as described herein, but design flow 100 is described here for the purposes of illustration. As illustrated, the overall design flow 100 includes a design phase 110, a device fabrication phase 120, a design verification phase 130, and a device verification phase 140. The design phase 110 involves an initial design input operation 101 where the basic elements and functionality of a device are determined, as well as revisions based on various analyses and optimization of a circuit design. This design input operation 101 is where initial layouts for a clock tree structure and sinks are generated, before adjustments are made to ensure that timing requirements for each sink are met. The initial strategy, tactics, and context for the device to be created are also generated in the design input operation 101, depending on the particular design algorithm to be used.

In some embodiments, following an initial selection of design values in design input operation 101, a routing tree may be generated, in accordance with various embodiments described herein, during optimization operation 111 or layout instance 112, along with any other automated design processes. As described below, design constraints for a routing tree structure and sinks which receive a signal from the routing tree structure may be initiated with design inputs in design input operation 101, and then may be analyzed and optimized using timing analysis according to various embodiments. While design flow 100 shows such optimization occurring prior to layout instance 112, updates to a routing tree may be performed at any time to improve expected operation of a circuit design. For example, in various embodiments, constraints for blocks in a circuit design may be generated prior to routing of connections in a circuit design, after routing, during register transfer level (RTL) operations, or as part of a final signoff optimization or verification prior to a device fabrication operation 122. Certain embodiments of operations described herein for generating or updating a routing tree structure may therefore involve iterations of design input operation 101, optimization operation 111, and layout instance 112 generation. In other systems, other design processes may be used.

After design inputs are used in design input operation 101 to generate a circuit layout, and any optimization operations 111 are performed, a layout is generated in layout instance 112. The layout describes the physical layout dimensions of the device that match the design inputs. This layout may then be used in a device fabrication operation 122 to generate a device, or additional testing and design updates may be performed using designer inputs or automated updates based on the design simulation 132 operations or extraction, 3D (three-dimensional) modeling, and analysis 144 operations. Once the device is generated, the device can be tested as part of device test 142 operations, and layout modifications generated based on actual device performance.

Design updates 136 from design simulation 132, design updates 146 from device test 142 or extraction, 3D modeling, and analysis 144 operations, or direct design input operation 101 may occur after an initial layout instance 112 is generated. In various embodiments, whenever design inputs are used to update or change an aspect of a circuit design, a timing analysis and optimization operation 111 may be performed.

Figure 2A:
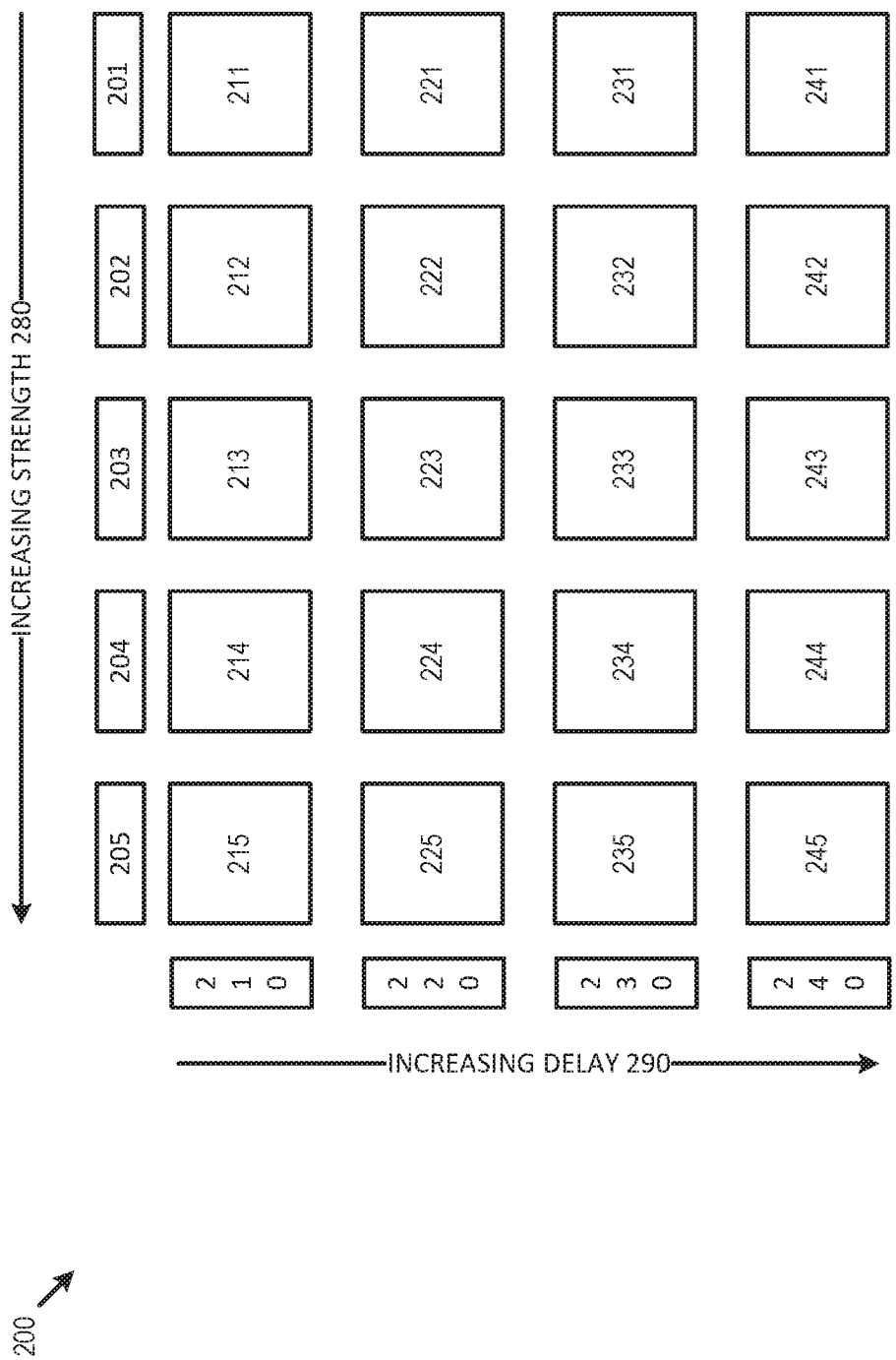
FIG. 2A illustrates an example clock gate matrix in accordance with some embodiments.

FIG. 2A illustrates an example clock gate matrix 200 in accordance with some embodiments. As described above, a circuit design can include clock trees with one or more clock gates to improve the performance of the circuit design. A clock gate included in a circuit design can be selected from multiple different clock gate types (e.g. different clock gate designs or structures) which have different characteristic values. In particular, a specific clock gate type can have a particular strength value and a delay value. The strength value is correlated with the area used in the circuit design, but the delay of a particular circuit design can vary between different clock gate types with the same strength. As part of a design flow, such as design flow 100 above, an input list of clock gate types that are available for the design flow can be identified. Embodiments described herein can organize the data for the clock data types available to a design, and use this data to select the particular clock gate type to be used in a position within the circuit design (e.g. in a routing tree of the circuit design) based not just on a drive power of the selected clock gate type, but also based on delay values to improve delay characteristics of the circuit design such as skew.

Some embodiments, in order to use the data about the clock gate types, accesses an input list with the data and organized the data into a clock gate matrix such as clock gate matrix 200. This input list can be provided by a designer, or accessed from a clock tree synthesis database provided by EDA tools, or bay any other such source. Clock gate matrix 200 includes 20 different clock gate types, shown as clock gate types 211-215, 221-225, 231-235, and 241-245. The clock gate matrix 200 includes a strength dimension 280, and a delay dimension 290, with columns 201-205 each containing an associated set of clock gate types having the same or similar strength values, and rows 210, 220, 230, and 240 each having an associated set of clock gate types having the same or similar delay values. In some embodiments, a threshold variance can be selected to allow clock gate types with different values to be in the same row or column if the values are within the threshold variance (e.g. within 5% of a target, or within a select value such as 10 ns). Other embodiments can leave sections of a matrix empty if no clock gate type matches a particular set of dimensions (e.g. values at a particular strength and delay value combination).

Figure 2B:
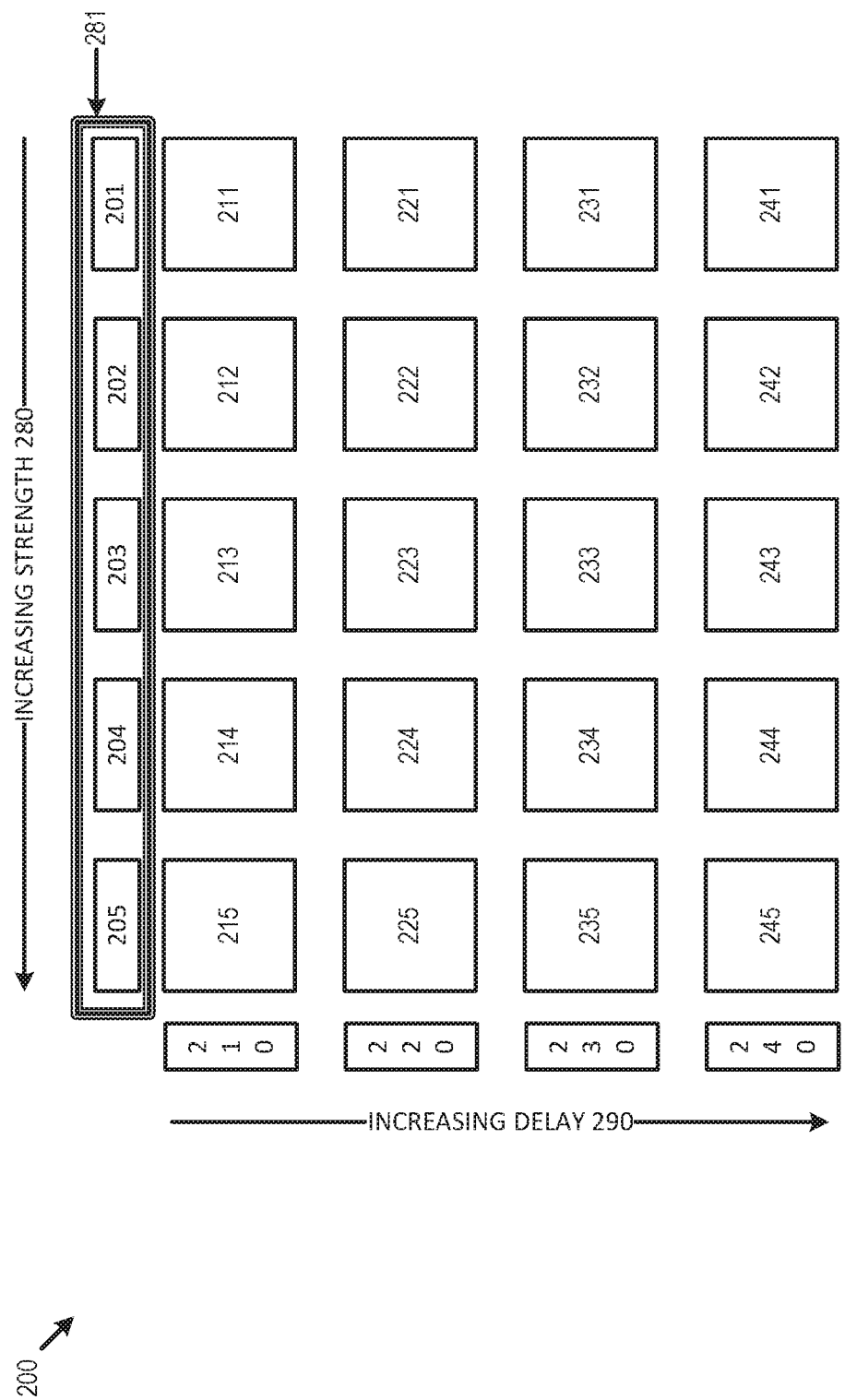
FIG. 2B illustrates aspects of an example clock gate matrix in accordance with some embodiments.

When a routing tree is initially generated, the clock gate types can be used to select initial types for clock gates to be included in the system, or the system can simply identify the largest number of sinks that can be driven by an acceptable set of clock gates (e.g. the set of clock gates with the highest strength), and generate an initial routing tree based on this assumption, with clock gates in the initial routing tree to be resized during optimization. Depending on the specifics of a circuit design, different clock gates in a routing tree can drive different numbers of sinks for various reasons, even if all clock gates are initially assumed to have a clock gate type with the largest available strength. As described in additional detail below, and initial resizing or clock gate type selection can identify the exact power needed for a particular clock gate in a particular position within a routing tree, and select the smallest (e.g. lowest strength) value for the particular clock gate. FIG. 2B illustrates aspects of an example clock gate matrix in accordance with some embodiments for selecting a strength value for a clock gate. As illustrated in FIG. 2B, a strength selection operation 281 can be made using the strength values identified in columns 201-205 to provide the power to drive the fanout of a particular clock gate.

For example, if a routing tree has 10,000 sinks, all to be assigned to associated clock gates. If the strongest clock gate type available to the design can drive 20 sinks, the clock tree synthesis can attempt to use 500 clock trees to drive the 10,000 sinks. However, certain clock gates may have fewer than the maximum number of possible sinks in an associated fanout (e.g. sinks connected to the clock gate) due to physical position or other such characteristics within the design. Rather than simply using a single clock gate type, the circuit design can use an initial resizing to lower the strength of clock gates to match the number of sinks (e.g. flip flop elements) within the particular clock gate's fanout. This both reduces the size of the clock gate, and reduces the power used by the clock gate which has the strength reduced.

Figure 2C:
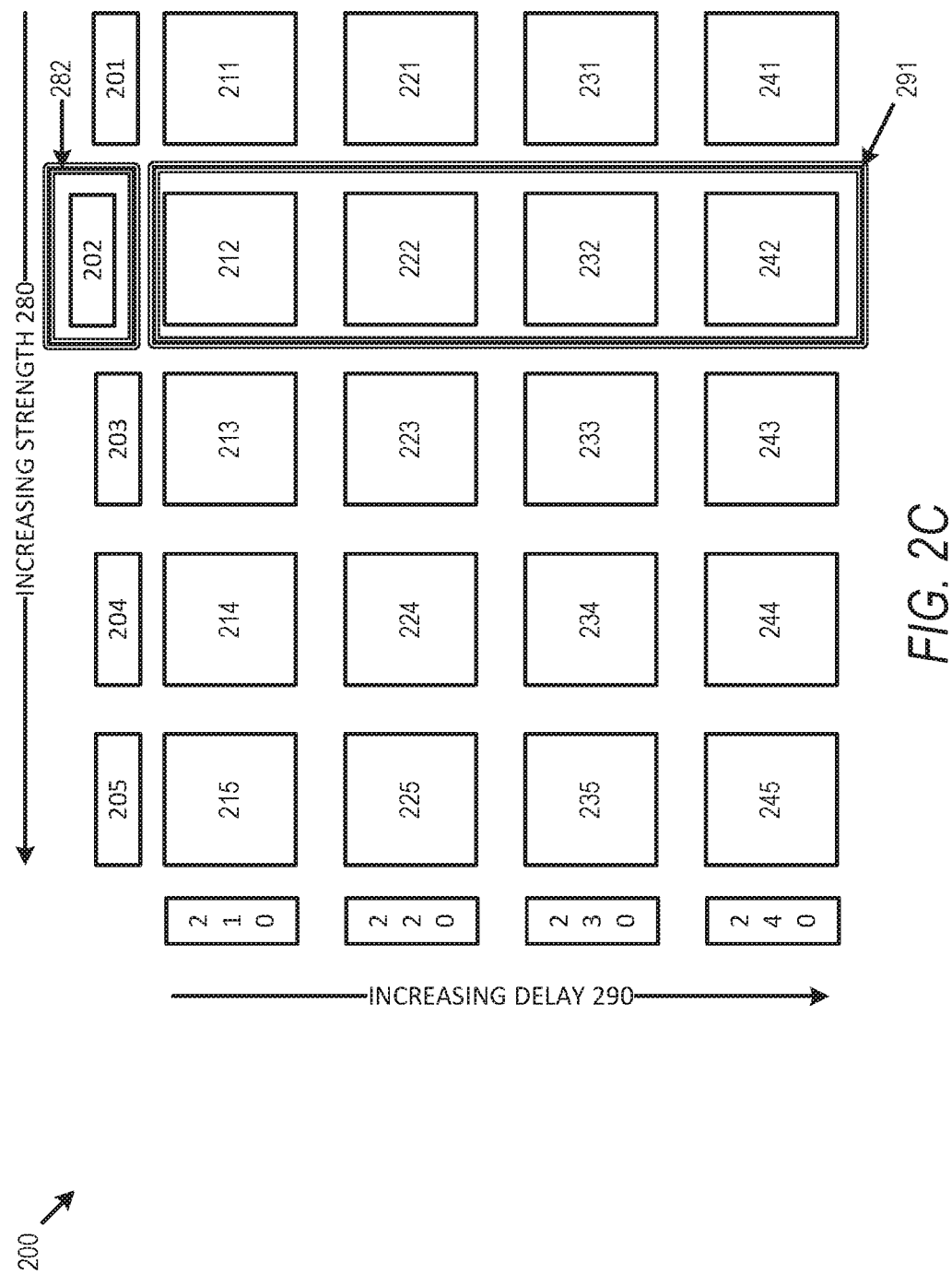
FIG. 2C illustrates aspects of an example clock gate matrix in accordance with some embodiments.

Once an initial resizing or size selection to match the power needed by a particular clock gate is done, a second resizing can be performed with the multi-dimension matrix illustrated in FIGS. 2A-C. FIG. 2C illustrates aspects of an example clock gate matrix in accordance with some embodiments. In FIG. 2C a power associated with column 202 is selected as part of a strength selection 282 from previous strength selection operation 281. In various embodiments, a default clock data type can be selected when the strength selection 282 occurs. This can use the lowest delay clock gate type, or any other such default or user selected option. The characteristics of the routing tree and the impact of the clock data types having the strength value of column 202 can then be analyzed in a subsequent resizing to select a particular clock gate type to improve delay characteristics of the routing tree in a delay selection operation 291. Delay selection operation 291 maintains the strength value from strength selection 282, but considers the various delay values from rows 210, 220, 230, and 240 while maintaining the selected strength value, such that any of clock gate types 212, 222, 232, 242 can be selected based on their impact on timing characteristics of the clock tree from their associated different delay values.

Figure 3A:
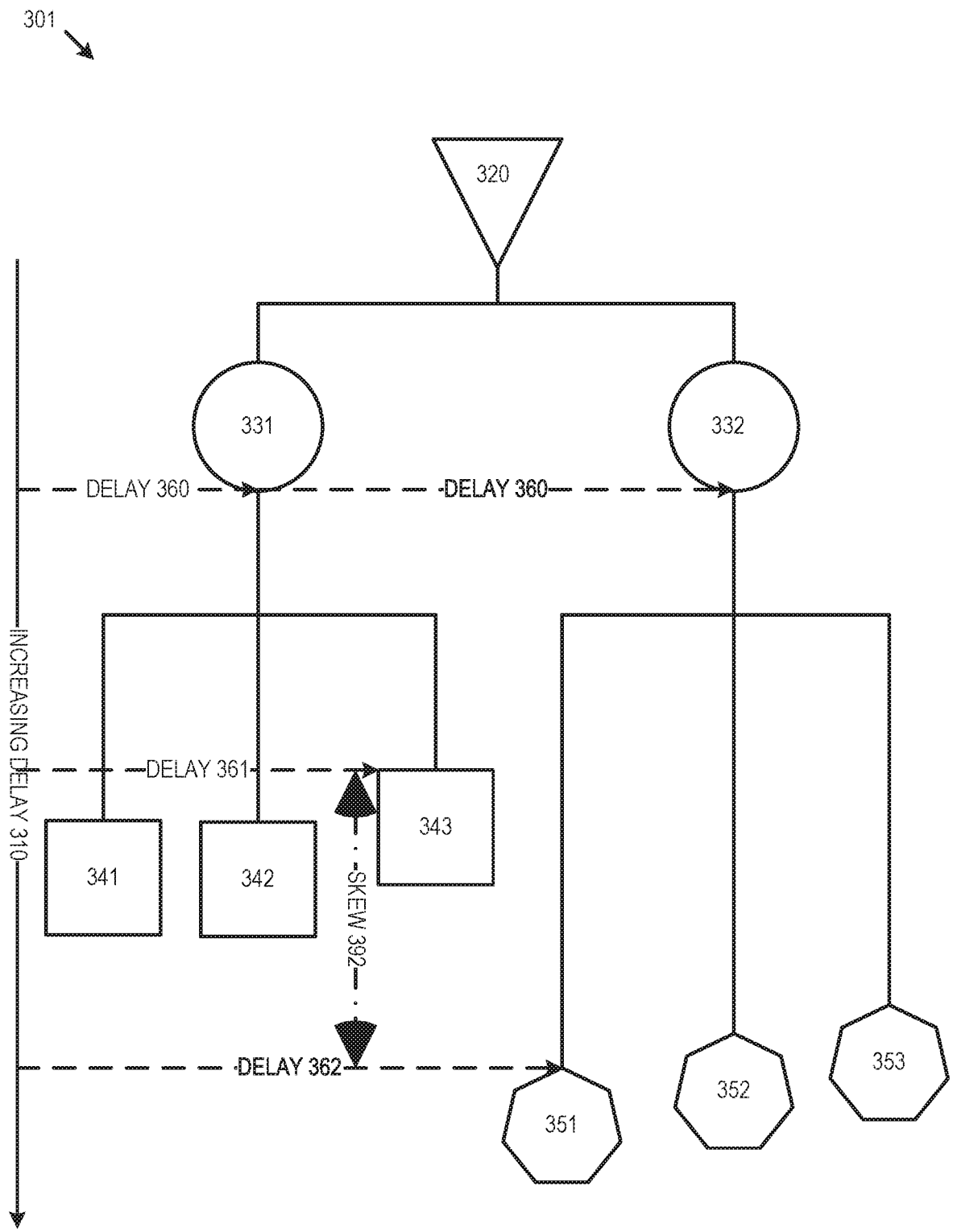
FIG. 3A illustrates a timing view of a simple routing tree in accordance with some embodiments.

FIG. 3A illustrates a timing view 301 of a simple routing tree in accordance with some embodiments. Timing view 301 includes clock source 320, clock gates 331 and 332, and sinks 341-343 and 351-353. Timing view 301 is structured as an increasing delay 310 from clock source 320. The outputs of both clock gate 331 and clock gate 332 are shown as having the same delay 360 value. The earliest delay to a sink is delay 361 to sink 343 and the latest delay to a sink is delay 362 to sink 351. The delay values are determined by the route from the source to the sink, including the wire length of the path, and the insertion delay of the clock gate in the particular route from the source 320 to a particular sink. The skew 392 of the routing tree is the difference between the maximum and minimum delays.

As described above, the clock gates 331 and 332 can be resized using different clock data types from the available clock gate types for a circuit design (e.g. the types in clock gate matrix 200) to adjust the delay values for a particular clock gate (e.g. the delay value of the clock gate which adds to the path delay for sinks in the clock gate's fanout). Once an initial clock gate type is selected for clock gates 331 and 332 (e.g. the smallest size or lowest strength to drive the three sinks in the fanout of each clock gate), then the clock gate type for each can be resized based on delay to reduce skew 392.

Figure 3B:
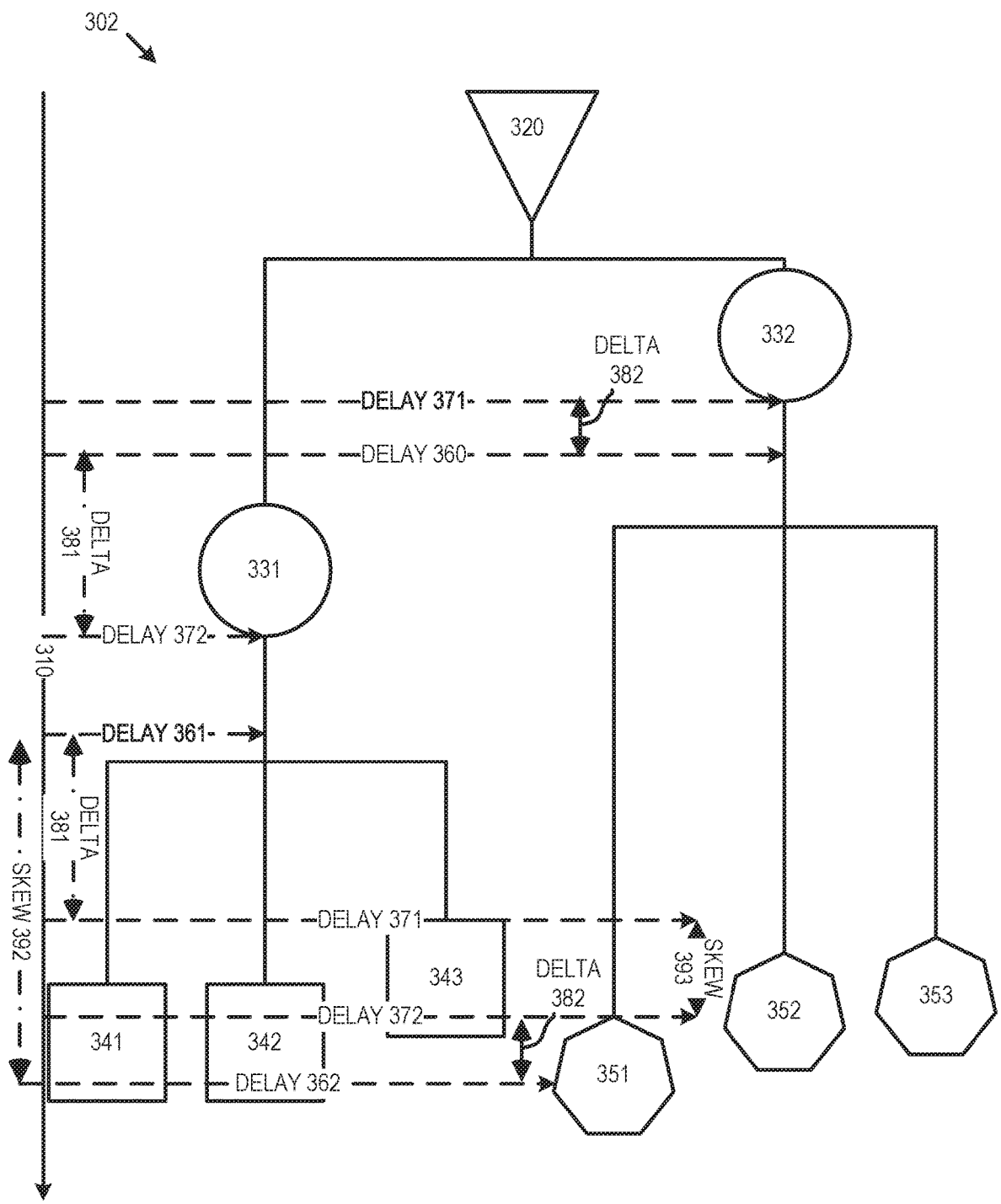
FIG. 3B illustrates a timing view of a simple routing tree after clock gate delays are adjusted by clock gate resizing in accordance with some embodiments.

FIG. 3B illustrates a timing view 302 of a simple routing tree after clock gate delays are adjusted by clock gate resizing in accordance with some embodiments. In FIG. 3B the clock gate types of both clock gate 331 and 332 are adjusted to change the delay associated with each clock gate. The delay values for clock gate 332 is reduced, so that the new delay at the output of clock gate 332 is delay 371 with a delta (e.g. change) value 382. Similarly, the clock gate type of clock gate 331 has an increased delay value with a delta value 381, so that the new output delay from clock gate 331 is delay 372 instead of delay 360. This change in the delay values for clock gates 331 and 332 propagates through their respective fanouts, so that the delay of sinks 342-343 is increased by delta value 381 so the new shortest delay is delay 371 instead of delay 361. The delay of sinks 351-353 is decreased by delta value 382 so the new longest delay is delay 372. This significantly decreases the value of the new skew 393 from the previous skew 392, improving the performance of the illustrated routing tree. In other embodiments, rather than trying to keep skew values close to zero, a design can target particular skew values, such as 20 picoseconds (ps) based on a desired clock delay between certain sinks. In such embodiments, the delay values of sinks can be adjusted to target such values rather than simply minimizing skew. Similarly, other timing values can be targeted in various embodiments, depending on the particular design preferences of a specific circuit design.

Figure 4:
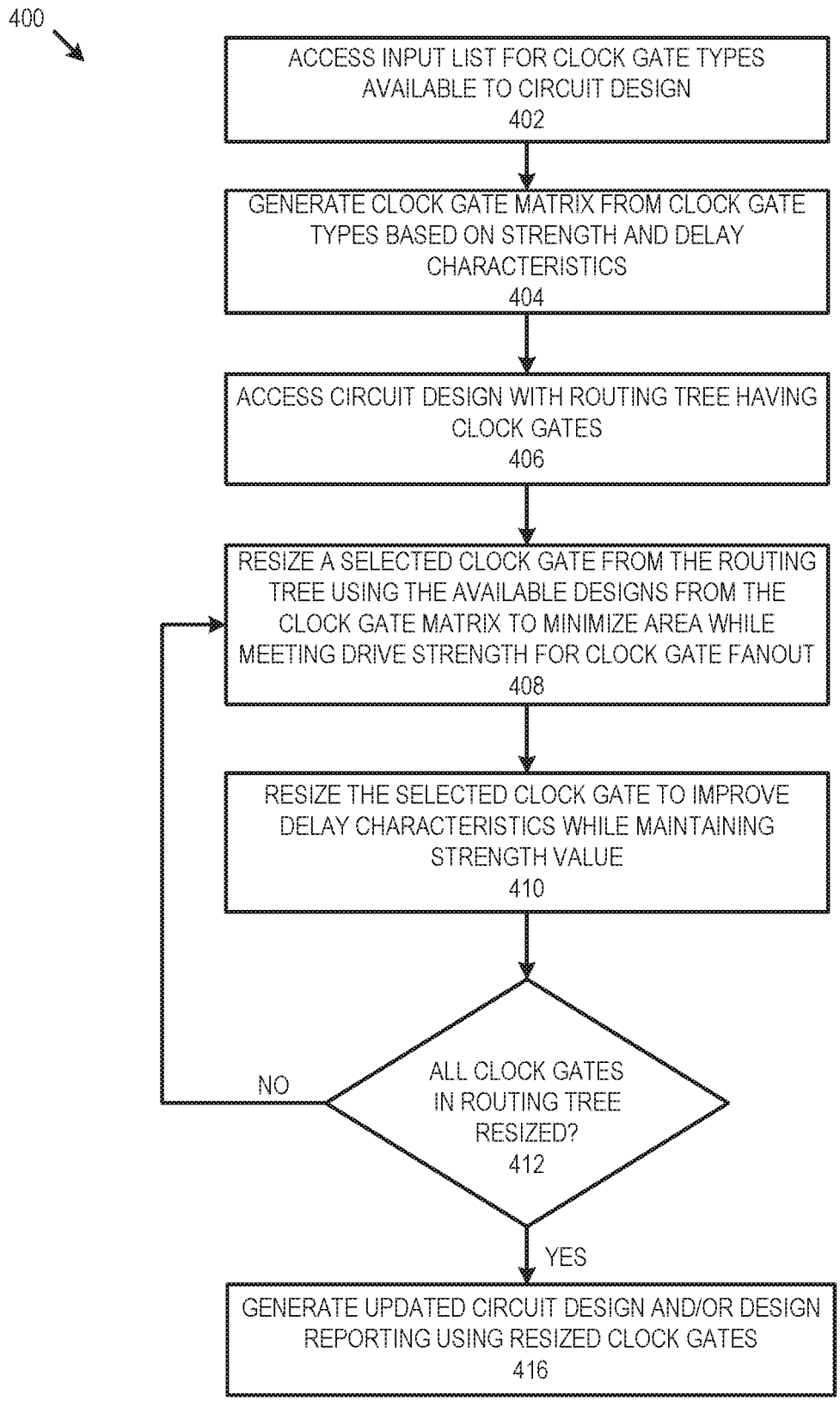
FIG. 4 is a flow diagram for resizing clock gates along multiple dimensions in accordance with some embodiments.

FIG. 4 is a flow diagram for resizing clock gates along multiple dimensions in accordance with some embodiments. Flow 400 can be part of a design flow 100, or any such design flow of a circuit design with a routing tree and multi-dimensional clock gate type data. Operation 402 involves accessing the clock gate type data as an input list of clock gate types available to a particular circuit design. This input list can be in any format that makes the size and/or strength values as well as the delay values for particular clock gate types available. This data can, in some embodiments, be models of clock gate structures which can be included in a circuit design based on the different available fabrication or element inclusion options. The data from the different clock gate types is then organized into a clock gate matrix in operation 404. Such a clock gate matrix can be similar to clock gate matrix 200, or can be in any format to make the data available to resizing operations for selecting a clock gate type for particular clock gate positions within the design in later operations (e.g. the data can be structured as an ordered list, table, array, or any format within memory in various embodiments).

After the data for the available clock gate types is identified, then in operation 406 the structure of the initial circuit design is accessed, including a routing tree with clock gates. A first resize operation 408 resizes a selected clock gate to minimize the area used by the clock gate while meeting the drive strength for the clock gate's fanout. Reducing the strength of a particular clock gate can also change the slew characteristic, and so the clock gate strength is reduced to the extent that slew limitations are not violate (in addition to meeting the fanout strength needed). As described above, this involves selecting a clock gate type with an adequate size (e.g. strength) while keeping the size as small as possible without violating slew limits to reduce power and area usage while maintaining the ability to drive the sinks in the connected fanout.

Once the initial strength based resizing is performed in operation 408 for a selected clock gate, then operation 410 involves an additional resizing along a second dimension (e.g. with strength as a first dimension and delay as a second dimension). In operation 410, selection of different clock gate types which maintain the strength selected in operation 408 are considered to identify improvements in delay characteristics, and a final clock gate type is selected for the particular clock gate based on the delay characteristics desired. In operation 412, this is repeated for all clock gates. In some embodiments, clock gates can be considered together based on the impact of delays in different clock gates on a delay value (e.g. skew being modified by different clock gates as in FIG. 3B). Once all clock gates have a selected clock gate type designed along the selected multiple dimensions, then in operation 416, an updated circuit design is generated and/or design reporting is generated. Design reporting can include an output of design values, such as total area use, total negative slack, (TNS) worst negative slack (WNS), skew values, slew values, and other such design characteristics.

Figure 5:
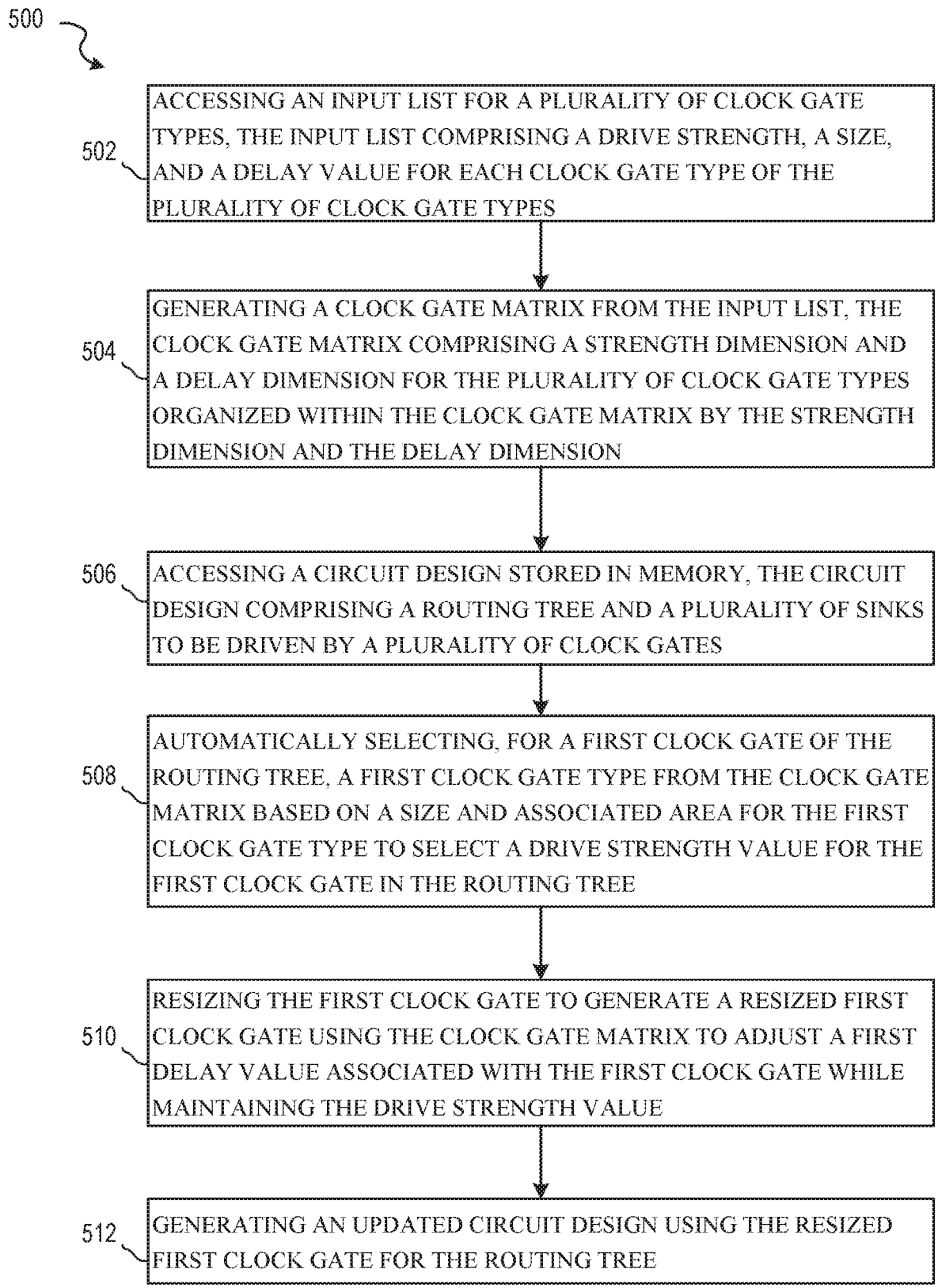
FIG. 5 describes a method of multi-dimension clock gate design in accordance with some embodiments.

FIG. 5 describes a method 500 of clock gate design accordance with some embodiments. In some embodiments, method 500 is a method performed by an EDA computing device to generate design files for a circuit design. In some embodiments, method 500 is represented by instructions stored in a memory of an EDA computing device or in a non-transitory computer-readable medium, where the instructions cause the EDA computing device to perform method 500 when executed by one or more processors.

Method 500 begins with operation 502 accessing an input list for a plurality of clock gate types, the input list comprising a drive strength, a size, and a delay value for each clock gate type of the plurality of clock gate types. In some embodiments, the strength and size can be correlated so that only a size or a strength is considered. A strength can be organized as a number of elements in the circuit design (e.g. sinks or flip-flop elements) that can be driven by a clock gate of a particular type, or by other element characteristics indicative of strength and a clock gates suitability to drive a fanout of a given size and configuration. This input list data is then used in operation 504 for generating a clock gate matrix from the input list, with the clock gate matrix comprising a strength dimension and a delay dimension for the plurality of clock gate types organized within the clock gate matrix by the strength dimension and the delay dimension. In various other embodiments, additional dimensions can be used, but the embodiments described herein include at least two dimensions (e.g. strength and delay).

In some embodiments the initial data organization operations above can be performed by a different device that creates default or system database data that can be used in different circuit designs. In some embodiments, the data (e.g. input list) is provided to an EDA device that organized the clock gate matrix and then proceeds with the multi-dimension clock gate design for clock tree synthesis in a particular circuit design. In either case, operation 506 proceeds with accessing a circuit design stored in memory, the circuit design comprising a routing tree and a plurality of sinks to be driven by a plurality of clock gates. This circuit design is also associated with the input data, such that a designer has identified the input list as including clock gate types suitable or available for the circuit design, so that the clock gates in the routing tree of the circuit design can be resized using any of the clock gate types in the clock gate matrix if the clock tree synthesis operations determine that a selected clock gate types is selected for a particular clock gate in the circuit design.

A first selection or resizing of a clock gate in the circuit design occurs in operation 508 with the system automatically selecting, for a first clock gate of the routing tree, a first clock gate type from the clock gate matrix based on a size and associated area for the first clock gate type to select a drive strength value for the first clock gate in the routing tree. In some embodiments, this selection confirms a previous default or largest strength clock gate type. In other embodiments, this involves a change in clock gate type (e.g. a resizing) to reduce power usage or meet the fanout strength characteristics for a particular clock gate position in the circuit design. Operation 510 then involves a second dimensional design consideration, with a resizing of the first clock gate to generate a resized first clock gate using the clock gate matrix to adjust a first delay value associated with the first clock gate while maintaining the drive strength value. The first selection of operation 508 can be considered a first dimensional design consideration (e.g. strength or area), and the second selection (e.g. resizing) of operation 510 can be considered a second dimensional design consideration (e.g. delay). These operations can be repeated in various combinations for different clock gates in the circuit design to identify combinations of clock gate types to improve performance of the design, including resizing certain clock gates in conjunction when the jointly impact a characteristic (e.g. skew). Once the resizing operations for the clock gates is complete, then operation 512 involves generating an updated circuit design using the resized first clock gate for the routing tree.

Some such embodiments therefore operate where the clock gate matrix is a two-dimensional matrix consisting of the plurality of clock gate types from the input list organized by associated values according to the strength dimension and the delay dimension. Other embodiments can involve other dimensions or data structures to achieve the same result of providing the strength and delay information for use in multiple resizing (e.g. clock gate type selection) operations.

In some embodiments, the first clock gate type is selected from the clock gate matrix to minimize the associated area used by the first clock gate while meeting drive strength limits of a first fanout from the first clock gate. In some embodiments, the first clock gate type is further selected from the clock gate matrix to minimize power usage of the first clock gate. In some embodiments, the resized first clock gate is further generated to adjust the delay value of the first clock gate to minimize skew in the routing tree. In some embodiments, the resized first clock gate is further generated based on a targeted skew variation between branches of the routing tree. In some embodiments, the resized first clock gate is further generated based on target slew, skew, and max insertion delay design values for the circuit design.

When repeating the operations for each clock gate in the circuit design, some embodiments can operate by automatically selecting, for each of the plurality of clock gates of the routing tree, an associated clock gate type from the clock gate matrix based on an associated size to select an associated drive strength value for said each of the plurality of clock gates in the routing tree. The process can then also include resizing said each of the plurality of clock gates of the routing tree to generate a plurality of resized clock gates, each of the plurality of resized clock gates generated to adjust an associated delay value for said each of the plurality of clock gates the associated drive strength value. As indicated above, these operations can occur repeatedly and in various combinations to meet design characteristics of the circuit design.

In some embodiments, after performance of some resizing operations, reporting can be generated by calculating a worst negative slack (WNS) value and a total negative slack (TNS) value for the routing tree after generated the plurality of resized clock gates using the clock gate matrix, and generating an output report comprising the WNS value and the TNS value.

In some embodiments, the operations proceed after operation 512 and any associated confirmation that design rule violations have been addressed by an updated circuit design, with generating or initiating generation of a set of masks from the updated circuit design for use in generating an integrated circuit comprising the updated circuit design. The component arrangement defined and generated in the above operations may then be used to fabricate (e.g., generate) or initiate generation of an integrated circuit using the component arrangement. In various embodiments, various devices, systems, and methods are used to fabricate devices based on the updated circuit design. In some embodiments, this includes generation of masks and the use of machinery for circuit fabrication. In various implementations, files generated by embodiments described herein are used to create photolithographic masks for lithography operations used to generate circuits according to a circuit design, where a pattern defined by the masks is used in applying a thin uniform layer of viscous liquid (photo-resist) on the wafer surface. The photo-resist is hardened by baking and then selectively removed by projection of light through a reticle containing mask information. In some implementations, the files are further used for etching patterning, where unwanted material from the surface of the wafer is removed according to details described in the design files, where a pattern of the photo-resist is transferred to the wafer by means of etching agents. In some embodiments, aspects of design files generated according to the operations described herein are used for deposition operations, where films of the various materials are applied on the wafer. This may involve physical vapor deposition (PVD), chemical vapor deposition (CVD) or any such similar processes. Some embodiments may use files generated according to operations described herein for chemical mechanical polishing, where a chemical slurry with etchant agents is used to planarize to the wafer surface, for oxidation where dry oxidation or wet oxidation molecules convert silicon layers on top of the wafer to silicon dioxide, for ion implantation where dopant impurities are introduced into a semiconductor using a patterned electrical field, or for diffusion where bombardment-induced lattice defects are annealed. Thus, in various embodiments, systems and operations include not only computing devices for generating updated circuit design files, but also hardware systems for fabricating masks, controlling IC fabrication hardware, and the hardware and operations for fabricating a circuit from a circuit design (e.g., component arrangement) generated in accordance with various embodiments described herein.

Additionally, it will be apparent that any apparatus or operations described herein in accordance with various embodiments may be structured with intervening, repeated, or other elements while still remaining within the scope of the contemplated embodiments. Some embodiments may include multiple receivers, along with any other circuit elements. Some embodiments may function with described operating modes as well as other operating modes. The various embodiments described herein are thus presented as examples, and do not exhaustively describe every possible implementation in accordance with the possible embodiments.

Figure 6:
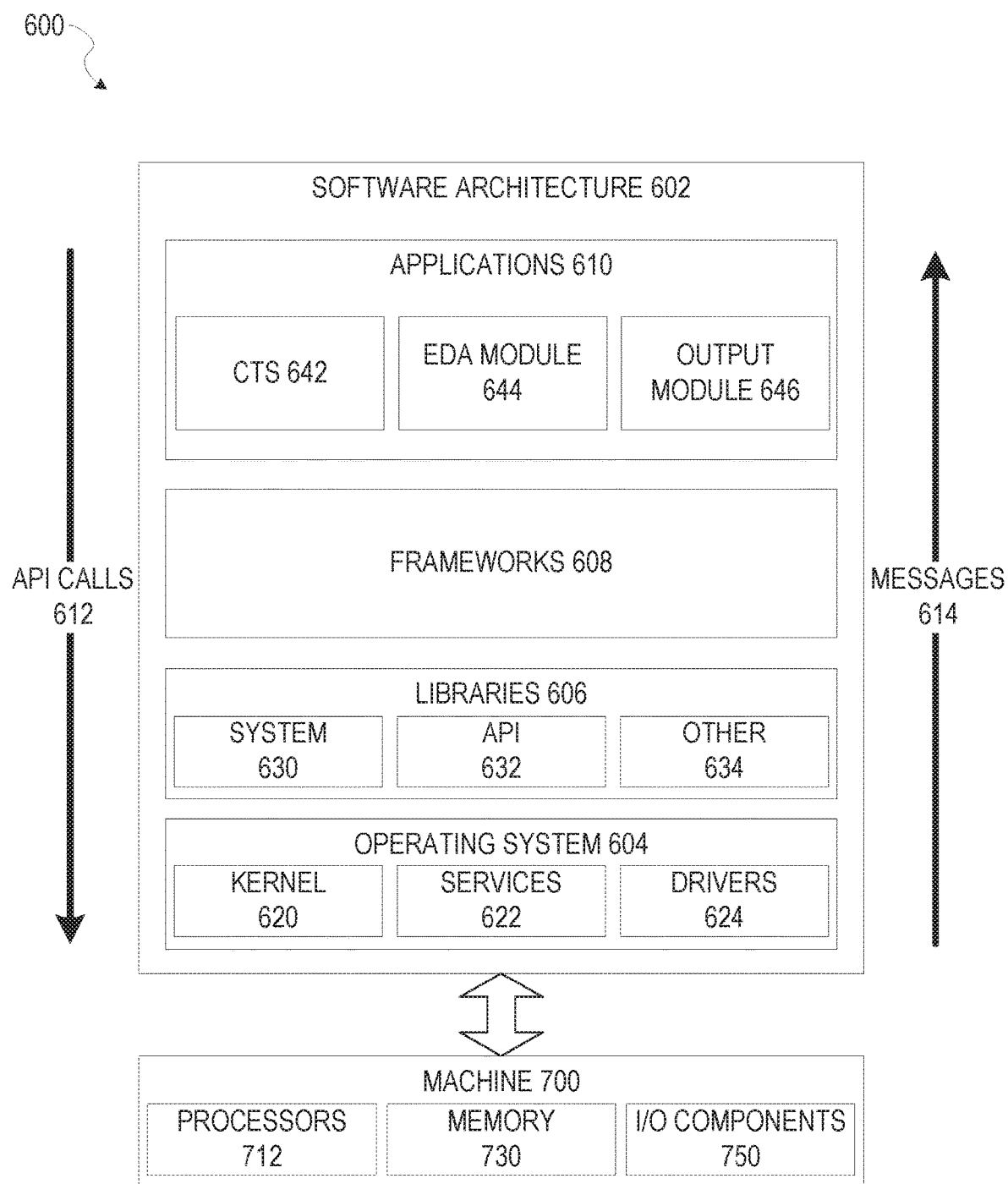
FIG. 6 is a block diagram illustrating an example of a software architecture that may be operating on an EDA computer and used with methods for routing tree generation to update a circuit design, according to some example embodiments.

FIG. 6 is a block diagram 600 illustrating an example of a software architecture 602 that may be operating on an EDA computer and used with methods for modifying a balanced clock structure, according to some example embodiments. Software architecture 602 can be used as an electronic design automation computing device to implement any of the methods described above. Aspects of software architecture 602 may, in various embodiments, be used to store circuit designs and execute timing analysis or optimization in an EDA environment to generate circuit designs, with physical devices generated using these circuit designs.

FIG. 6 non-limiting example of a software architecture 6 602, and it will be appreciated that many other architectures can be implemented to facilitate the functionality described herein. In various embodiments, the software architecture 602 is implemented by hardware such as machine 700 that includes processors 710, memory 730, and input/output (I/O) components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments. In various embodiments, any client device, server computer of a server system, or any other device described herein may operate using elements of software architecture 602. An EDA computing device described herein may additionally be implemented using aspects of the software architecture 602, with the architecture 602 adapted for operating to perform clock synthesis and modification of balanced clock structures in accordance with embodiments herein.

In one embodiment, an EDA application of applications 610 performs routing tree generation and/or adjustments, according to embodiments described herein, using various modules within software architecture 602. For example, in one embodiment, an EDA computing device similar to machine 700 includes memory 730 and one or more processors 710. The processors 710 implement a clock tree synthesis module 642 to improve routing tree synthesis in some embodiments. The processors 710 also implement additional EDA module(s) 644 to implement various circuit design operations. The design is finalized by an output module 646 if the criteria/design thresholds are met.

In some embodiments, processor-implemented output module 646 may then be used to update a display of I/O components 750 of the EDA computing device with data associated with the updated routing tree generated by the process.

In various other embodiments, rather than being implemented as modules of one or more applications 610, some or all of modules 642, 644, and 646 may be implemented using elements of libraries 606 or operating system 604.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, signal processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 such as libraries of multi-instance blocks for use in an EDA environment or other libraries that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 606 may also include other libraries 634.

The software frameworks 608 provide a high-level common infrastructure that can be utilized by the applications 610, according to some embodiments. For example, the software frameworks 608 provide various graphic user interface (GUI) functions, high-level resource management, high-level location services, and so forth. The software frameworks 608 can provide a broad spectrum of other APIs that can be utilized by the applications 610, some of which may be specific to a particular operating system 604 or platform. In various embodiments, the systems, methods, devices, and instructions described herein may use various files, macros, libraries, and other elements of an EDA design environment to implement analysis described herein. This includes analysis of input design files for an integrated circuit design, along with any element for routing tree synthesis, testing, and design updating that may be used as part of or along with the embodiments described herein. While netlist files, library files, SDC files and view definition files are examples that may operate within a software architecture 602, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) is configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 700 including processors 710), with these operations being accessible via a network (e.g., the Internet) and via one or more appropriate interfaces (e.g., an API). In certain embodiments, for example, a client device may relay or operate in communication with cloud computing systems, and may store media content such as images or videos generated by devices described herein in a cloud environment.

The performance of certain of the operations may be distributed among the processors, not only residing within a single machine 700, but deployed across a number of machines 700. In some example embodiments, the processors 710 or processor-implemented modules are located in a single geographic location (e.g., within a home environment, an office environment, or a server farm). In other example embodiments, the processors 710 or processor-implemented modules are distributed across a number of geographic locations.

Figure 7:
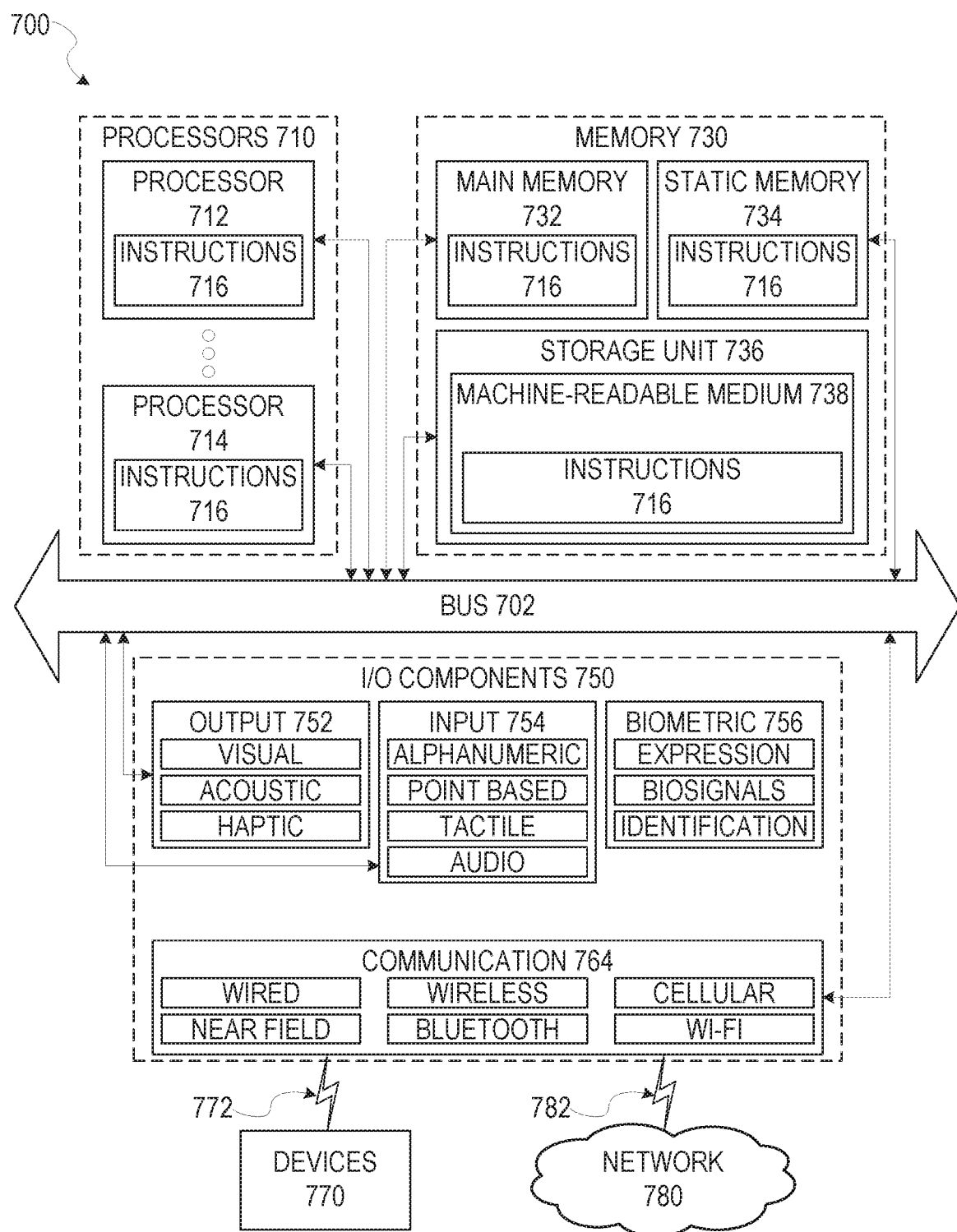
FIG. 7 is a diagrammatic representation of a machine in the form of a computer system within which a set of instructions are executed, causing the machine to perform any one or more of the methodologies discussed herein, according to some example embodiments.

FIG. 7 is a diagrammatic representation of the machine 700 in the form of a computer system within which a set of instructions may be executed for causing the machine 700 to perform any one or more of the methodologies discussed herein, according to an example embodiment. FIG. 7 shows components of the machine 700, which is, according to some embodiments, able to read instructions from a machine-readable medium (e.g., a machine-readable storage medium) and perform any one or more of the methodologies discussed herein. In some embodiments, the machine 700 may operate with instructions 716 (e.g., software, a program, an application, an applet, an app, or other executable code) for causing the machine 700 to perform any one or more of the methodologies discussed. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), a media system, a cellular telephone, a smart phone, a mobile device, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 712 with a single core, a single processor 712 with multiple cores (e.g., a multi-core processor 712), multiple processors 710 with a single core, multiple processors 710 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow 100, or outputs for circuit fabrication. In various embodiments, outputs of a timing analysis are used to generate updates and changes to a circuit design, and after a final closure of timing with all associated timing thresholds and design requirements met, circuit design output files are used to generate masks and other physical outputs for generation of a circuit. As described herein, "requirements," "design elements," and other aspects of a circuit design refer to selectable values that are set as part of the design of a circuit. Such design requirements or elements may be adjusted by a system operator or circuit designer to suit the particular goals of a project or circuit that results from the operations described herein.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a USB).

Transmission Medium

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-speed Packet Access (HSPA), Worldwide Interoperability for Microwave Access (WiMAX), Long Term Evolution (LTE) standard, others defined by various standard-setting organizations, other long range protocols, or other data transfer technology.

Furthermore, the machine-readable medium 738 is non-transitory (in other words, not having any transitory signals) in that it does not embody a propagating signal. However, labeling the machine-readable medium 738 "non-transitory" should not be construed to mean that the medium 738 is incapable of movement, the medium 738 should be considered as being transportable from one physical location to another. Additionally, since the machine-readable medium 738 is tangible, the medium 738 may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, techniques, instruction sequences, and computing machine program products that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A computer-implemented method comprising:
   accessing, using one or more hardware processors, an input list for a plurality of clock gate types, the input list comprising a drive strength, a size, and a delay value for each clock gate type of the plurality of clock gate types;
   generating, using the one or more hardware processors, a clock gate matrix from the input list, the clock gate matrix comprising a strength dimension and a delay dimension for the plurality of clock gate types organized within the clock gate matrix by the strength dimension and the delay dimension;
   accessing, by the one or more hardware processors, a circuit design stored in memory, the circuit design comprising a routing tree and a plurality of sinks to be driven by a plurality of clock gates;
   automatically selecting by the one or more hardware processors, for a first clock gate of the routing tree, a first clock gate type from the clock gate matrix based on a size and associated area for the first clock gate type to select a drive strength value for the first clock gate in the routing tree;
   resizing, using the one or more hardware processors, the first clock gate to generate a resized first clock gate using the clock gate matrix to adjust a first delay value associated with the first clock gate while maintaining the drive strength value;
   calculating a worst negative slack (WNS) value for the routing tree, the routing tree including the resized first clock gate; and
   generating, by the one or more hardware processors, an updated circuit design using the resized first clock gate for the routing tree and an output report including the WNS value.

2. The computer-implemented method of claim 1, wherein the clock gate matrix is a two-dimensional matrix consisting of the plurality of clock gate types from the input list organized by associated values according to the strength dimension and the delay dimension.

3. The computer-implemented method of claim 1, wherein the first clock gate type is selected from the clock gate matrix to minimize the associated area used by the first clock gate while meeting drive strength limits of a first fanout from the first clock gate.

4. The computer-implemented method of claim 3, wherein the first clock gate type is further selected from the clock gate matrix to minimize power usage of the first clock gate.

5. The computer-implemented method of claim 1, wherein the resized first clock gate is further generated to adjust the delay value of the first clock gate to minimize skew in the routing tree.

6. The computer-implemented method of claim 1, wherein the resized first clock gate is further generated based on a targeted skew variation between branches of the routing tree.

7. The computer-implemented method of claim 1, wherein the resized first clock gate is further generated based on target slew, skew, and max insertion delay design values for the circuit design.

8. The computer-implemented method of claim 1 further comprising:
   automatically selecting, for each of the plurality of clock gates of the routing tree, an associated clock gate type from the clock gate matrix based on an associated size to select an associated drive strength value for said each of the plurality of clock gates in the routing tree; and
   resizing said each of the plurality of clock gates of the routing tree to generate a plurality of resized clock gates, each of the plurality of resized clock gates generated to adjust an associated delay value for said each of the plurality of clock gates the associated drive strength value.

9. The computer-implemented method of claim 8 further comprising:
   calculating a total negative slack (TNS) value for the routing tree after generated the plurality of resized clock gates using the clock gate matrix; and
   generating the output report comprising the WNS value and the TNS value.

10. The computer-implemented method of claim 9 further comprising:
    confirming that all design rule violations have been addressed by the updated circuit design; and
    initiating fabrication of the updated circuit design.

11. A device comprising:
    a memory configured to store a circuit design and a clock gate matrix, the circuit design comprising a routing tree and a plurality of sinks to be driven by a plurality of clock gates in the routing tree, the clock gate matrix comprising data for a plurality of clock gate types organized by an area and a delay for each of the plurality of clock gate types;
    one or more processors coupled to the memory and configured to perform operations comprising:
    automatically selecting, for a first clock gate of the routing tree, a first clock gate type from the clock gate matrix based on a size and associated area for the first clock gate type to select a drive strength value for the first clock gate in the routing tree;
    resizing the first clock gate to generate a resized first clock gate using the clock gate matrix to adjust a first delay value associated with the first clock gate while maintaining the drive strength value; and
    calculating a worst negative slack (WNS) value for the routing tree, the routing tree including the resized first clock gate.

12. The device of claim 11, wherein the one or more processors are further configured to perform operations comprising:
    accessing an input list for a plurality of clock gate types; and
    generating the clock gate matrix from the input list, the clock gate matrix comprising a strength dimension and a delay dimension for the plurality of clock gate types organized within the clock gate matrix by the strength dimension and the delay dimension.

13. The device of claim 11, wherein the one or more processors are further configured to perform operations comprising:

automatically selecting, for each of the plurality of clock gates of the routing tree, an associated clock gate type from the clock gate matrix based on an associated size to select an associated drive strength value for said each of the plurality of clock gates in the routing tree; and resizing said each of the plurality of clock gates of the routing tree to generate a plurality of resized clock gates, each of the plurality of resized clock gates generated to adjust an associated delay value for said each of the plurality of clock gates the associated drive strength value.

14. The device of claim 13, wherein each of said plurality of resized clock gates is further generated based on target slew, skew, and max insertion delay design values for the circuit design.

15. The device of claim 14, wherein the one or more processors are further configured to perform operations comprising calculating a total negative slack (TNS) value for the routing tree after generated the plurality of resized clock gates using the clock gate matrix;

generating an output report comprising the WNS value and the TNS value;

confirming that all design rule violations have been addressed by an updated circuit design comprising the plurality of resized clock gates; and initiating fabrication of the updated circuit design.

16. A non-transitory computer-readable medium comprising instructions that, when executed by one or more processors of an electronic design automation (EDA) computing device, cause the device to perform operations comprising:

accessing an input list for a plurality of clock gate types, the input list comprising a drive strength, a size, and a delay value for each clock gate type of the plurality of clock gate types;

generating a clock gate matrix from the input list, the clock gate matrix comprising a strength dimension and a delay dimension for the plurality of clock gate types organized within the clock gate matrix by the strength dimension and the delay dimension;

accessing a circuit design stored in memory, the circuit design comprising a routing tree and a plurality of sinks to be driven by a plurality of clock gates;

automatically selecting, for each of the plurality of clock gates of the routing tree, an associated clock gate type from the clock gate matrix based on an associated size to select an associated drive strength value for said each of the plurality of clock gates in the routing tree; and resizing said each of the plurality of clock gates of the routing tree to generate a plurality of resized clock gates, each of the plurality of resized clock gates generated to adjust an associated delay value for said each of the plurality of clock gates the associated drive strength value;

calculating a worst negative slack (WNS) value for the routing tree, the routing tree including the plurality of resized clock gates;

generating an updated circuit design using the plurality of resized clock gates for the routing tree and an output report including the WNS value.

17. The non-transitory computer readable medium of claim 16, wherein the associated clock gate type is selected from the clock gate matrix for said each of the plurality of clock gates to minimize a total area used by the plurality of clock gates while meeting drive strength limits for each fanout associated with said each of the plurality of clock gates.

18. The non-transitory computer readable medium of claim 16, wherein the associated clock gate type for said each of the plurality of clock gates is further selected from the clock gate matrix to minimize power usage of the plurality of clock gates.

19. The non-transitory computer readable medium of claim 16, wherein each of said plurality of resized clock gates is further generated minimize skew in the routing tree.

20. The non-transitory computer readable medium of claim 16, wherein each of said plurality of resized clock gates is further generated based on target slew, skew, and max insertion delay design values for the circuit design.

* * * * *